2,341,270

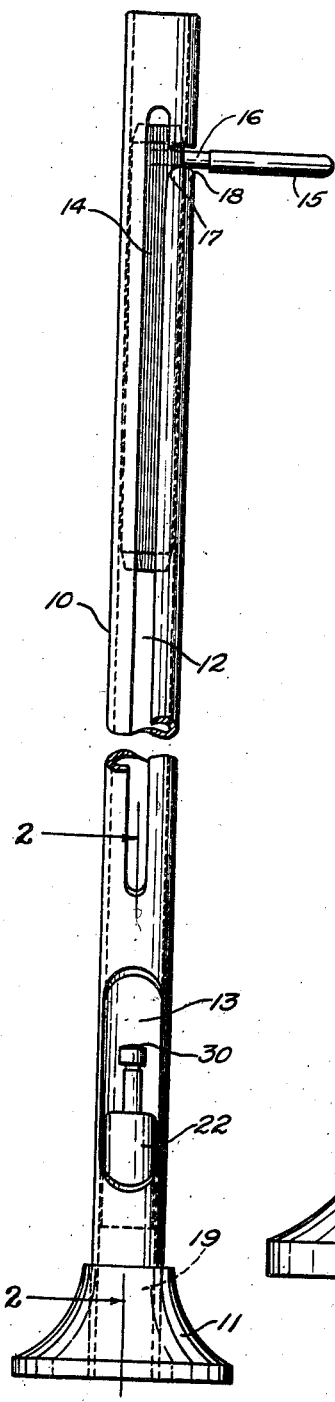
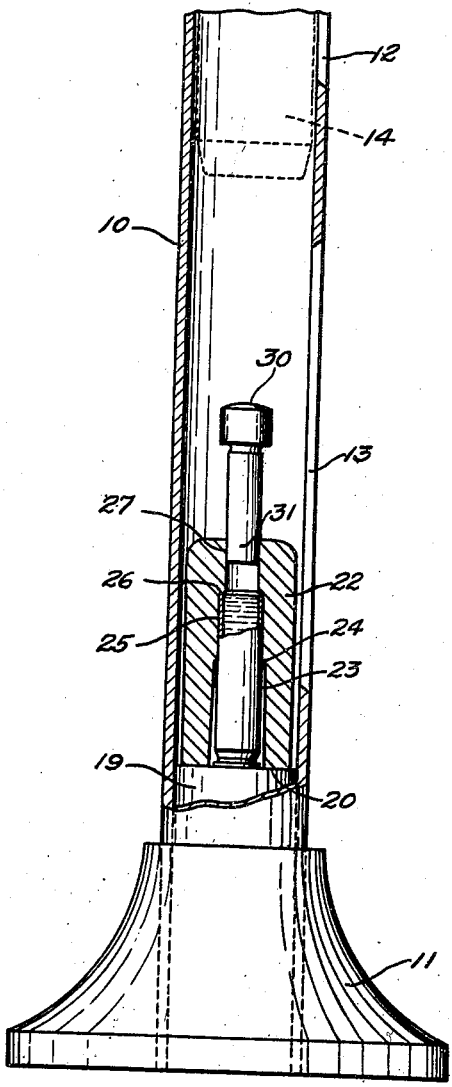
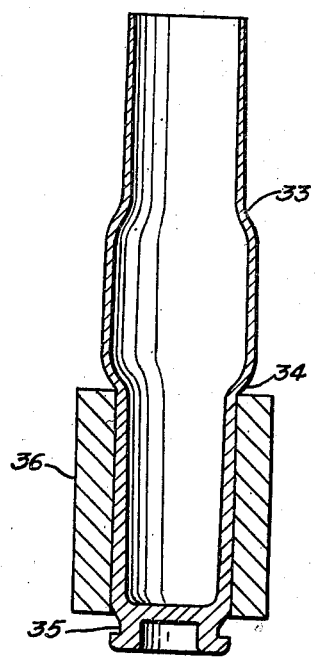
Fig. 1
Fig. 2
Fig. 3
INVENTORS.
George R. Eckstein
Arthur A. Deam
BY Harold L. Gammons
AGENT Patented Feb. 8, 1944

UNITED STATES PATENT OFFICE 2,341,270

HYDRAULIC TESTING MACHINE AND METHOD OF TESTING

Arthur A. Deam, Independence, Mo., and George R. Eckstein, Bridgeport, Conn., assignors to Remington Arms Company, Inc., Bridgeport, Conn., a corporation of Delaware Application October 27, 1942, Serial No. 463,522

7 Claims. (Cl. 265—14)

This invention relates to material testing machines, and, more particularly, to an improved method and means for testing tubular articles.

An object of the invention is to provide improved hydraulic means for testing tubular articles. A further object is to determine the line of transformation of an annealed metallic tubular article by subjecting the article to internal pressure.

Other objects, features and advantages of the invention will be disclosed in the following specification which is descriptive of one embodiment of the invention.

It will be understood, however, that the specific apparatus shown and described is for the purpose of illustration only and that the invention is not limited thereby but includes all embodiments and modifications falling within the scope of the appended claims.

In the drawing:

Fig. 1 is an elevation of the hydraulic testing apparatus of this invention.

Fig. 2 is an enlarged fragmentary view, partially in section, on line 2—2 of Fig. 1.

Fig. 3 is an elevation, in section, of an annealed cartridge case which has been deformed by the hydraulic testing apparatus of Figs. 1 and 2, the line of deformation of which is located by means of a ring gauge.

Although the present invention relates to an improved means for testing tubular articles of any suitable material or configuration, the particular tubular articles chosen to illustrate the invention are metallic cartridge cases. It will be understood, however, that the apparatus may be adapted for testing tubular articles of other types.

The manufacture of small arms ammunition and ammunition components is an extremely specialized art embodying many exacting requirements of which one of the most severe is the problem of obtaining metallic cartridge cases and especially steel cartridge cases of substantially uniform quality.

As is generally known, a cartridge case is formed from a blank or disk of suitable metal by a series of cupping and drawing operations, suitable heat treatments being made between successive draws in order to soften the metal for additional working. After the final draw, the case has a substantially cylindrical body and a closed somewhat dome-shaped base, the latter being squared up by subsequent operations known as pocketing and heading. Thereafter the base, now termed the head of the case, is finished in a head turning machine which trims the head to size and forms the extraction groove. The case is thus ready for necking which may be defined as an operation or operations designed to reduce the diameter of the open end of the case and to form the conventional shoulder and tapered body. It will be appreciated, however, that the case has been hardened by the last draw, and, consequently, it is necessary to anneal the upper portion of the case so as to soften the metal prior to the necking operations.

Moreover, this anneal, which is termed the body anneal, has an additional function in that it is designed to build into or contribute to the case those qualities which are essential to its successful performance in the chamber of a firearm. These qualities may be defined as a satisfactory proportioning within the body of the case of certain strength characteristics of the metal, namely yield strength and ductility so that the case may undergo the severe strains to which it is subjected on firing without developing splits or causing cut-offs or other extraction difficulties.

It has been found that these qualities may be obtained by controlling the extent of the anneal or more specifically by limiting the anneal to substantially the upper half of the case, so that the lower half will be found to have sufficient hardness to obviate hard extractions while the upper half of the case will be soft enough to prevent cut-offs and splits.

The lower limit of the anneal thus becomes a measure of the proportioning of the hard and soft areas in the body of the case and is termed the line of anneal or transformation line. By comparing the location of the transformation line on the body of the test case with a standard measurement, an accurate indication will be had of the quality of the test case.

The present method of determining the quality of a case, and, in particular, an unfinished annealed case by finding the line of transformation is extremely slow and painstaking. Briefly, the test entails a microscopic examination of an etched section of a case to determine the approximate location of a line marking the beginning of crystalline growth in the metal, this line being indicative of the extent of the anneal. At best, this method is tedious and one requiring the laborious preparation of specimens for examination.

A second method of testing cases for proper quality has been to actually fire the loaded case in a gun. Obviously, this test is not wholly satisfactory since the cases are tested long after a considerable quantity have been finished and loaded. As a result, the test for the quality of the case is made not only extremely remote from the point at which quality was built into the case but also incurs a great waste of ammunition components.

The present invention provides improved means and methods for testing the quality of cartridge cases, namely by the location of the transformation line of an unfinished annealed case.

Referring to the drawing,

Figs. 1, 2 and 3 show one form of apparatus particularly adapted to determine the transformation line of an unfinished case having a body anneal.

This apparatus comprises a hollow column 10 which may be a substantially cylindrical pipe or tube supported vertically by a floor flange 11 bolted to the floor, the lower end of the column being stepped therein in screw threaded engagement therewith. The column 10 is provided with a longitudinal slot or guide 12 in one wall extending from a point somewhat below the top of the column to a point suitably spaced from the lower end thereof. Immediately below the lower end of the slot 12 and in alignment therewith is a second longitudinal slot 13 which is considerably shorter than the slot 12 but is of sufficient width to pass an article supporting housing hereinafter described. Both ends of the slot 13 are closed, the lower end terminating short of the lower end of the column. To illustrate the relative sizes of the parts, the column 10 may comprise a one and one half inch pipe substantially six feet long provided with a half inch slot 12 and a two inch slot 13.

It will be understood, however, that these dimensions are for the purpose of illustration only and that the apparatus may be suitably proportioned to test articles of wholly different size and shape.

Mounted to slide within the hollow column 10 is a gravity actuated means for transmitting a sudden force to the article being tested. The means shown comprises a cylindrical weight 14 having slightly tapered ends, and, in this instance, weighing substantially eight pounds. Suitable means for raising the weight in the column comprises a handle 15 secured adjacent the upper end of the weight and projecting laterally therefrom at substantially right angles. The handle 15 has a reduced portion 16 at its inner end of suitable diameter to slide freely in the slot 12, and, in this manner, prevents the weight from rotating as it is moved up and down in the column.

Suitable means for locking the weight 14 in its cocked position comprises a laterally disposed notch 17 in the upper end of the slot 12. The bottom edge of the notch 17 has a downwardly sloping shoulder 18 adapted to be engaged by the handle 15 to support the weight in the upper end of the column. By giving the handle 15 a quarter turn, it moves off of the shoulder 18 into the slot 12, thus freeing the weight and permitting it to drop down the column.

Supported within the lower end of the column is a base or base plug comprising a solid cylindrical member 19 having squared ends, the upper end presenting an anvil-like supporting surface 20.

The means for supporting and housing the test cartridge cases comprises a heavy walled cylindrical member 22 adapted to pass through the slot 13 of the column 10 and to seat on the anvil surface 20 of the base plug 19. The housing is provided with an axial bore, the portion 23 of which is tapered as shown, its maximum diameter being at its base and considerably greater than the outside diameter of the test case so that the head and body portion of the case make a relatively loose fit therein, as shown in Fig. 2. A tapered shoulder 24 is formed in the upper part of the bore 23 which reduces the diameter of the taper bore at this section to substantially the outside diameter of the cartridge case. This section of reduced diameter forms a constriction or bore indicated at 25 which extends upwardly from the shoulder 24 making a relatively close fit with the adjacent portion of a test case and terminating in a second tapered shoulder 26. The latter further reduces the diameter of the original bore so as to form a bore 27 somewhat less in diameter than the diameter of the bore 25 and substantially equal to the inside diameter of the test case.

As indicated in Fig. 2, the longitudinal disposition of each shoulder 24 and 26 within the housing is such that the length of the constriction or bore 25 corresponds substantially to that portion of the case which in subsequent processing will form the shoulder and mouth portions of the finished case.

In accordance with this construction, the open end of the test case comes against the shoulder 26, as shown in Fig. 2, so tha the shoulder 26 constitutes, in effect, an abutment for the open end of the case while the bore 27 forms, with a plunger hereinafter described, a seal which prevents the escape of the liquid from the test case when the latter is subjected to high pressures.

The member 30 comprises a plunger for compressing the liquid in the test case and embodies a head and a cylindrical stem 31, the diameter of the latter being substantially equal to the inside diameter of the case. The stem of the plunger is adapted to make a sliding substantially seal fit in the bore 27 and to be moved downwardly therein into the open end of a test case supported in the housing.

In use, the apparatus is assembled in the manner shown in Figs. 1 and 2, the annealed cartridge case being substantially filled with a liquid such as water. When the weight 14 is released, it drops down and strikes a sudden blow on the head of the plunger. The stem 31 of the plunger is thereupon driven down into the open end of the cartridge case compressing the liquid therein and thereby transmitting the force of the blow substantially uniformly in all directions within the case. The hydraulic pressure developed within the case is of sufficient magnitude to overcome the retention strength of the annealed portions of the case, and hence to deform these portions within the housing.

It will be evident, however, that the deformation of the annealed portions of the case is effectively confined to a limited section of the case namely to that part of the body which is unconfined or loosely supported within the tapered bore 23 of the housing. The upper part or open end of the case, although annealed, is confined and effectively reinforced by the surrounding closely fitting walls of the constricted bore 25, the combined retention strength of the upper part of the case and walls 25 being sufficient to withstand the pressure developed within the case.

As a result, the case is deformed in substantially the manner shown in Fig. 3, the deformation being such as to extend downwardly from a point 33 adjacent the upper end of the case corresponding to the shoulder 24 of the constricted bore 25 to a definite point or line 34 on the body of the case at which the deformation shoulders down. Since the entire body portion of the case has been subjected to a uniform internal pressure, this line 34 marking the end of the deformation, is indicative of a difference in retention strength of adjacent sections of the wall of the case; and this difference in retention strength is, of course, a direct measure of the extent of the anneal. That is to say, the line of deformation closely corresponds to the line of transformation or anneal line of the case. Actually the transformation line is at the smallest radius of the shoulder 34 of the deformation.

Suitable means for locating the position of the line of deformation on the case with respect to some arbitrarily chosen point thereon, as, for example, the extraction groove 35 comprises a ring gauge 36, as shown in Fig. 3, which is adapted to be slipped over the base or head end of the case and moved up until stopped by the shoulder 34. Thus, by measuring the distance between the extraction groove and the adjacent end of the ring gauge, a substantially accurate measure may be obtained of the location on the case of the anneal or transformation line. If this measurement indicates that the anneal line is above or below a standard, then the case must be rejected.

It will be evident, therefore, that the testing of unfinished cartridge cases for the body anneal line can be carried out in a minimum of time without the tedious and exacting requirements of an optical examination and with uniform accuracy.

What is claimed is:

1. The method of testing a hollow ammunition component comprising the steps of mounting said component in a housing, confining a portion of limited area of said component in said housing while leaving the unconfined portion thereof free for expansion, and then subjecting said hollow component to a uniform internal fluid pressure of substantially momentary duration and of sufficient magnitude to deform the unconfined portion of said component within said housing.

2. The method of testing a cartridge case comprising the steps of mounting said case in a housing, confining the mouth portion of said case in said housing while leaving the body portion thereof free for expansion, filling said case with liquid, confining said liquid within said case, and then subjecting said confined liquid to a blow of such magnitude as to develop sufficient internal pressure to deform the unconfined body portion of said case within said housing.

3. Hydraulic testing apparatus comprising a base; a housing mounted on said base, said housing having a bore comprising a constricted portion and an unconstricted portion for mounting a liquid containing tubular article on said base, the mouth portion of said article being uppermost and confined within the constricted portion of said bore, the body portion of said article being unconfined by the unconstricted portion of said bore; a plunger comprising a head and a stem adapted to be mounted in the upper end of said bore and movable therein into the mouth of the liquid filled tubular article; and an impact delivering means supported above said plunger and adapted to be released to strike said plunger head with a force of such magnitude as to develop hydraulic pressure sufficient to deform the unconfined portion of said tubular article within the unconstricted portion of the bore of said housing.

4. Hydraulic testing apparatus comprising a base; a housing mountable on said base, said housing having a bore comprising a substantially cylindrical constricted portion and an unconstricted frustum-shaped portion for mounting a liquid containing tubular article on said base, the mouth portion of said article being uppermost and confined within the cylindrical constricted portion of said bore, the body portion of said tubular article being unconfined and expandible within the unconstricted frustum-shaped portion of said bore; a plunger adapted to be mounted in the upper end of said bore and movable therein into the mouth of the liquid filled tubular article; and an impact delivering means supported above said plunger and adapted to be released to strike said plunger with a force of such magnitude as to develop hydraulic pressure sufficient to expand the unconfined body portion of said article within the unconstricted portion of said bore.

5. Hydraulic testing apparatus for testing for the transformation line of a tubular article having an annealed portion comprising a base; a hollow column fixedly mounted substantially vertically on said base, said column having slotted portions; an anvil separately mounted in said column; a housing adapted to be mounted on said anvil, said housing having a bore comprising a constricted portion and an unconstricted portion for supporting a liquid containing tubular article on said anvil with the mouth portion of said article uppermost and confined within the constricted portion of said bore, the body portion of said article being unconfined within the unconstricted portion of said bore; a plunger adapted to be mounted in the upper end of said bore and movable therein into the mouth of the liquid filled tubular article; and means for delivering a sudden blow to said plunger to expand the unconfined portion of said article within the unconstricted portion of said bore comprising a freely falling weight constructed and arranged to be supported at the upper end of said column in axial alignment with said plunger, said weight having means adapted to be guided in one of the slotted portions of said column.

6. Hydraulic testing apparatus for testing for the transformation line of a tubular article having an annealed portion comprising a base; a hollow column mounted substantially vertically on said base, said column having slotted portions; a housing adapted to be mounted within said column, said housing having a bore for supporting a liquid containing tubular article on said base with its mouth portion uppermost; a constriction in said bore adjacent the mouth portion of said article to confine said mouth portion within said bore, the unconfined portion of said article being expandible within the unconstricted portion of said bore; a plunger adapted to be mounted in the constricted end of said bore and movable therein into the mouth of the liquid filled tubular article; means for delivering a sudden blow to said plunger of such magnitude as to develop hydraulic pressure sufficient to expand the unconfined portion of said article into the unconstricted portion of said bore, said means comprising a freely falling weight slidable in said column, said weight having a handle projecting through one of the slots of said column for raising said weight into the upper end thereof; and a notch in said column adjacent the upper end of said slot adapted to be engaged by said handle for supporting said weight.

7. A testing apparatus comprising a housing for a liquid filled article to be tested, said housing being provided with a bore comprising a constricted portion and an unconstricted portion whereby portions of limited area of said article are confined in said housing and other portions of said article are unconfined; and means for subjecting the liquid in said article to a sudden pressure of sufficient magnitude to conform the unconfined portion of the article within the housing.

ARTHUR A. DEAM.
GEORGE R. ECKSTEIN.